Sept. 8, 1964  J. J. WOLF  3,147,964
CLOSED END-VARIABLE SPRING RATE BUSHING
Filed April 26, 1963  2 Sheets-Sheet 1
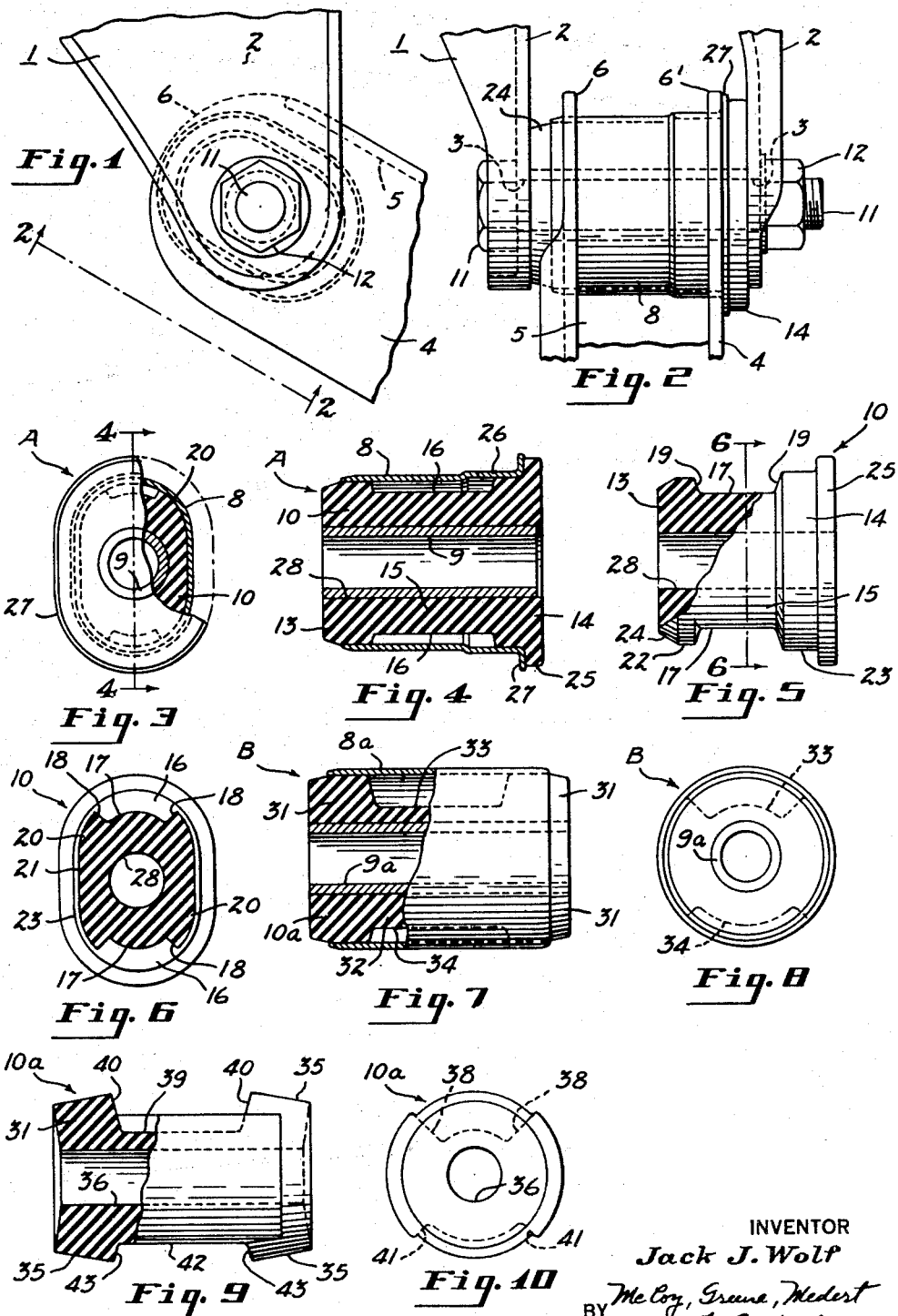
INVENTOR
Jack J. Wolf
BY McCoy, Greene, Medert
& Le Grotenhuis
ATTORNEYS Sept. 8, 1964   J. J. WOLF   3,147,964
CLOSED END–VARIABLE SPRING RATE BUSHING
Filed April 26, 1963   2 Sheets-Sheet 2

INVENTOR
Jack J. Wolf
BY McCoy, Greene, Medert
& Te Grotenhuis
ATTORNEYS

United States Patent Office 3,147,964
Patented Sept. 8, 1964

3,147,964
CLOSED END-VARIABLE SPRING RATE BUSHING
Jack J. Wolf, Logansport, Ind., assignor to The General Tire & Rubber Company, Akron, Ohio, a corporation of Ohio
Filed Apr. 26, 1963, Ser. No. 275,913
9 Claims. (Cl. 267—63)

The present invention relates to elastic rubber bushings for automobile suspensions and the like and more particularly to a durable elastic rubber bushing having a spring rate in a vertical direction materially different from its spring rate in a horizontal direction.

Heretofore, attempts have been made to design rubber bushings for vehicle suspensions in which a tubular rubber insert was compressed between inner and outer metal sleeves, but the useful life of these bushings has been limited when the bushing was designed to provide different spring rates in different directions.

It has now been found that a rubber bushing has greater useful life when provided with circumferentially continuous end portions which fill the space between the inner and outer sleeves and with diametrically opposed grooves of predetermined size and shape between said end portions, the rubber portions between the grooves being compressed between the inner and outer metal sleeves to provide maximum surface contact with the two sleeves and to prevent turning of the rubber surface relative to the metal surface. Rubber-to-metal bonding by vulcanization or by use of adhesives is avoided. This type of rubber bushing is well suited for use in the front suspension of a modern automobile where the rubber of the bushing is employed to cushion angular deflections of low magnitude.

An object of the invention is to provide a more durable and more efficient front suspension for an automobile.

A further object of the invention is to provide a simple inexpensive elastic rubber bushing having different spring rates in different directions and a very long useful life.

Another object is to improve the useful life of elastic rubber bushings.

Other objects, uses and advantages of the invention will become apparent to those skilled in the art from the following description and claims and from the drawings, in which:

FIGURE 1 is a fragmentary side elevational view on a reduced scale showing an automobile front-wheel suspension constructed according to the present invention;

FIGURE 2 is a fragmentary elevational view taken substantially on the line 2—2 of FIGURE 1 and on the same scale;

FIGURE 3 is an end view of the bushing assembly A used in the suspension of FIGURES 1 and 2, a portion being broken away and shown in section;

FIGURE 4 is a longitudinal sectional view taken on the line 4—4 of FIGURE 3 and on the same scale;

FIGURE 5 is a side elevational view of the rubber insert used in the bushing assembly A of FIGURES 3 and 4 on the same scale, a portion being broken away and shown in section;

FIGURE 6 is a transverse sectional view taken on the line 6—6 of FIGURE 5 and on the same scale;

FIGURE 7 is a side elevational view showing a modified form of bushing assembly B according to the invention, a portion being broken away and shown in longitudinal section;

FIGURE 8 is an end view of the bushing assembly B of FIGURE 7 on the same scale;

FIGURE 9 is a side elevational view of the rubber insert used in the bushing assembly B on the same scale as FIGURES 6 to 8, a portion being broken away or shown in section;

FIGURE 10 is an end view of the rubber insert as shown in FIGURE 9;

Figure 11:
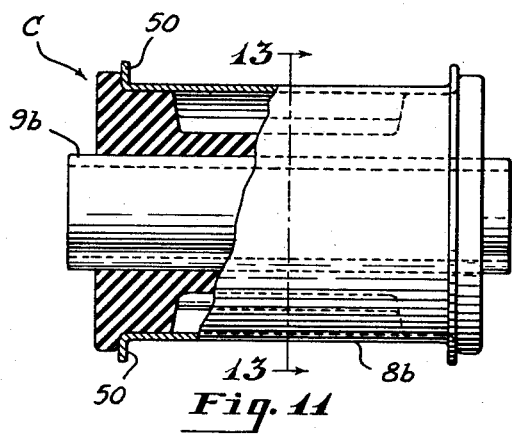
FIGURE 11 is an elevational view showing a modified form of bushing assembly C according to the invention, a portion being broken away and shown in section.

Referring more particularly to the drawings, which are drawn to scale and in which like parts are identified by the same numerals throughout the several views, FIGURES 1 and 2 show a portion of the front wheel suspension of a modern automobile in which an upper metal supporting member 1, rigidly connected to the metal frame of the automobile, has two parallel link portions 2 extending downwardly from the frame, said link portions having axially aligned circular openings 3. The front wheel suspension includes a lower rigid metal connecting member 4 of U-shaped cross section having a transverse portion 5 which rigidly connects the parallel end portions 6 of said connecting member. Said end portions are shaped to provide axially aligned openings to receive the tubular outer sleeve 8 of the bushing assembly A.

The bushing assembly A is drawn to scale in FIGURES 3 and 4 and consists of a tubular outer metal sleeve 8, which is axially elongated, a tubular inner metal sleeve 9 within and coaxial with said outer sleeve and having an axial length preferably greater than that of said outer sleeve, and a tubular elastic rubber insert 10 compressed between the cylindrical surfaces of said inner and outer sleeves and extending axially beyond the opposite ends of said outer sleeve. Said rubber insert is under relatively high axial elongation and radial compression as will be apparent from a comparison of FIGURES 4 and 5, the rubber insert in the normal unstressed condition as shown in FIGURE 5 having an axial length at least 10 percent and preferably 15 to 25 percent less than its length when assembled as shown in FIGURES 3 and 4.

The rubber insert 10 has outer end portions 13 and 14 which are relatively thick and have a cross-sectional area greater than that between the sleeves 8 and 9 which fill the space between said sleeves at opposite ends of the bushing, and the insert has an intermediate portion 15 between the portions 13 and 14 with a cross-sectional area less than that between the sleeves 8 and 9 due to the presence of two diametrically opposed axially elongated voids or grooves 16. Each of said grooves has a radial depth about ⅓ to 3 times the radial thickness of the rubber insert at the bottom of the groove and extends circumferentially about 60° to 100° (preferably 70° to 95°) around the periphery of the rubber insert. The axial length of each groove is about ½ to ⅔ the axial length of the rubber insert, but this is not always essential where the bushing is exceptionally long.

The marginal portions 20 of the rubber insert between the grooves each engage the outer sleeve 8 throughout more than ¼ the periphery of the outer sleeve when the insert is mounted between the inner and outer sleeves as shown in FIGURE 3 and each may extend 90° or more about the periphery of the unstressed rubber insert as shown, for example, in FIGURE 6.

Each of the grooves 16 has a bottom surface 17 of cylindrical shape, flat radial side surfaces 18, and end surfaces 19, which are preferably tapered slightly as shown in FIGURE 5. The marginal portions 20 of the rubber insert between the grooves 16 each have a smooth outer cylindrical surface 21 of oblate cross section generated by moving a line parallel to the axis of the bushing. The outer surfaces 20 are generally parallel to the internal surface of the outer sleeve 8, which has an oval cross section as shown in FIGURE 3. The outer surface 22 of the end portion 13 is also a smooth continuous cylindrical surface of the same shape as the internal surface of the sleeve 8. The portion 13 is preferably provided with a tapered end surface 24 to facilitate assembly.

The enlarged end portion 14 has a smooth circumferentially continuous outer cylindrical surface 23 similar to the surface 22 but of slightly greater diameter. The surface 23 is also generated by moving a line parallel to the axis to form a cylindrical surface of the same shape as the internal cylindrical surface of the sleeve 8 but of slightly larger diameter, as shown in FIGURE 5. It is preferable to provide a radial flange 25 on the end portion 14 to engage the end flange 27 of the sleeve 8 thereby limiting the movement of the rubber insert in one direction relative to the sleeve 8. The sleeve 8 preferably has an enlarged portion 26 of the same shape as the surface 22 but of greater axial length. This facilitates assembly of the bushing since it permits entry of the end portion 13 into the sleeve with a minimum axial force. The sleeve is provided with a radial flange 27 at the end of the portion 26 for engaging the rubber flange 25. The rubber insert has a cylindrical internal surface 28 with a normal diameter slightly less than the external diameter of the cylindrical inner sleeve 9.

The bushing assembly A, for some reason, is extremely durable and is capable of functioning efficiently throughout the life of an automobile even though it is subjected to high stresses millions of times. The radial depth of the groove 33 is preferably 50 to 150 percent greater than the depth of the groove 34, in the assembly B. This provides the assembly with characteristics which are highly desirable in certain types of suspension systems. Thus there is less resistance to vertical movement of the inner sleeve 9a relative to the outer sleeve than to lateral movement and less resistance to upward movement than to downward movement (when the bushing assembly is positioned as shown in FIGURE 8).

FIGURES 7 and 8 show a modified form of bushing assembly B somewhat different from the assembly A which also has a very long useful life. The assembly B comprises an outer cylindrical metal sleeve 8a, of circular cross section, an inner cylindrical metal sleeve 9a concentric to the sleeve 8a, and a tubular elastic rubber insert 10a compressed between the inner and outer sleeves. The rubber insert 10a, shown in FIGURES 9 and 10 in its normal unstressed condition prior to assembly, comprises two enlarged outer end portions 31 of the same size and an intermediate portion 32 integrally joining said end portions. The intermediate portion has a deep groove 33 and a shallow groove 34, said grooves having a shape similar to that of the grooves 16. Each groove 33 has flat radial sides 38, a bottom surface 39 of cylindrical shape, and end surfaces 40, which are inclined as shown in FIGURE 9 to provide the groove 33 with a longitudinal cross section similar to that of an isosceles trapezoid.

The groove 34 is similar to the groove 33 and has the same axial and circumferential dimensions but less depth. The groove has substantially flat radial side surfaces 41, a cylindrical bottom surface 34, and tapered end surfaces 43. Each of the end portions 31 has an outer tapered surface 35 of frusto-conical shape which is coaxial with the internal cylindrical surface 36 of the rubber insert and coaxial with the outer sleeve 8a. Said surface 35 has a normal diameter greater than the internal diameter of the outer sleeve 8a, and said surface 36 has a normal diameter less than the external diameter of the inner sleeve 9a as will be apparent from a comparison of the drawings which are drawn to scale. The surface 35 is preferably inclined 5 to 20 degrees relative to the axis of the insert.

Figure 12:
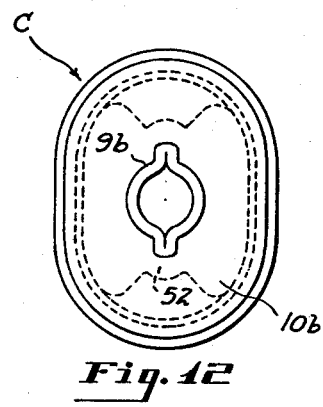
FIGURE 12 is an end view of the assembly of FIGURE 11 on the same scale.
Figure 13:
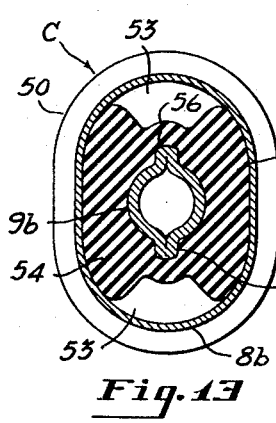
FIGURE 13 is a transverse sectional view taken on the line 13—13 of FIGURE 11 and on the same scale.

Another modified form of bushing assembly C is shown in FIGURES 11 to 13. It consists of a cylindrical outer metal sleeve 8b having radial end flanges 50 and a rounded oblate cross section, a tubular elastic rubber insert 10b, and an inner metal sleeve 9b coaxial with the sleeve 8b and having radially outwardly projecting ribs 56 on opposite sides thereof.

Figure 14:
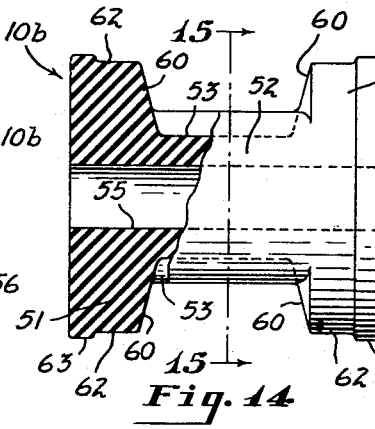
FIGURE 14 is a side elevational view of the rubber insert used in the bushing assembly C of FIGURES 11 to 13 and on the same scale, a portion being broken away and shown in section.
Figure 15:
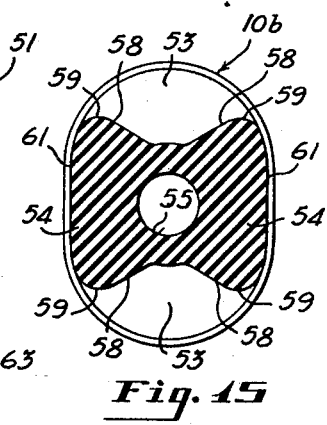
FIGURE 15 is a transverse sectional view taken on the line 15—15 of FIGURE 14 and on the same scale.

The bushing assembly B is symmetrical with respect to the line 15—15 of FIGURE 14 and has enlarged circumferentially continuous end portions 51 joined by an intermediate portion 52 having two grooves 53 on opposite sides thereof. The peripheral portions 54 between the grooves 53 engage the sleeve 8b throughout more than half the circumference of the sleeve as shown in FIGURE 13. FIGURES 14 and 15 show the rubber insert in its normal unstressed condition. It has a cylindrical internal surface 55 with a diameter less than the external diameter of the sleeve 9b. Such internal surface must stretch materially to receive the ribs 56 of the inner sleeve 9b as indicated in FIGURE 13, the bushing being assembled with the ribs 56 aligned with the two grooves 53.

Each of the grooves 53 has a longitudinal cross-section substantially in the form of an isosceles trapezoid as shown in FIGURE 14 due to the tapered end walls 60. In the normal unstressed condition the transverse cross section of the rubber insert is as shown in FIGURE 15, the side surfaces 58 of each groove being flat and the outer surfaces 59 of the groove being rounded. The smooth outer peripheral surfaces 61 of the rubber portions 54 are generated by a line parallel to the axis of the bushing, like the inner surface of the outer sleeve 8b, but the rubber must be compressed radially a substantial amount to fit in the bushing as shown in FIGURE 13.

Each of the end portions 51 of the unstressed rubber insert 10b has a smooth circumferentially continuous cylindrical outer surface 62 of oval cross section and a continuous radial flange 63 located to engage the metal flange 50 of the sleeve 8b when the bushing is assembled. Each cylindrical surface 62 of the unstressed rubber insert has the same shape as the cylindrical inner surface of the outer metal sleeve 8b but has a slightly greater diameter.

It will be understood that the terms "cylinder" and "cylindrical" are used herein in the broad sense to cover a surface generated by moving a line parallel to a fixed line and is not restricted to cylinders of circular cross section.

While the inner sleeve 9b is constructed different from the inner sleeve 9 or 9a, it will be understood that an inner sleeve having the same cross-sectional shape as the sleeve 9b may be used in the bushing assembly A or B to prevent turning movement of the metal sleeve relative to the rubber insert.

The rubber composition used in the rubber insert of the bushing assembly is conventional and forms no part of this invention. Such rubber composition may be a conventional tread rubber composition, for example, containing 50 to 90 parts of high-abrasion furnace (HAF) carbon black per 100 parts by weight of rubber hydrocarbons. The cured rubber may have, for example, a modulus at 300 percent elongation between 1000 and 2500 pounds per square inch.

Conventional methods may be employed to assemble the bushings of this invention. Suitable methods of assembling the bushings are disclosed, for example, in U.S. Patent Nos. 2,660,780; 2,690,001; 2,632,236; 2,877,543; 2,872,727; 2,844,398 and 2,840,893 and other patents.

In each of the bushing assemblies A, B and C the opposite end portions of each rubber insert have smooth circumferentially continuous surfaces of rounded cross section, such as the cylindrical surfaces 22 and 23 or the tapered surfaces 35, which engage the outer metal sleeve throughout its periphery, said end portions filling the space between the inner and outer sleeves. This construction is quite different from that of U.S. Patent No. 3,082,999 and provides the bushing with a longer useful life.

In said bushing assemblies A, B and C each of the diametrically opposed grooves has a radial depth which is ⅓ to 3 times the radial thickness of the insert at the bottom of the groove, and each groove extends 60 to 100 degrees around the periphery of the rubber insert, the two marginal portions of the insert between the grooves engaging the outer metal sleeve a total of more than 150 degrees of the periphery of the outer sleeve and preferably more than 200 degrees of said periphery. Each of the rubber portions between the grooves is under radial compression between the inner and outer sleeves like the circumferentially continuous end portions of the rubber insert. The axial length of each groove is at least ½ the overall length of the unstressed rubber insert and is usually no more than ⅔ of such overall length.

The vehicle suspension of this invention may, for example, be mounted on an automobile and constructed to provide a vertical spring rate of about 20,000 to 25,000 pounds per inch and a softer fore and aft rate of 10,000 to 15,000 pounds per inch. The radial and conical deflection of the bushing in the horizontal plane through the voids (grooves) permits wheel recession and anti-harshness qualities that are desirable without hindering car steering. Low amplitude angular deflections of 10° to 15° are necessarily induced in the bushing assembly in a typical automobile front wheel suspension system, but the bushing assembly of this invention has a very long useful life in spite of this angular deflection.

The bushing assembly of this invention preferably has an oblate rounded cross-section as in the assembly A or C (similar to an ellipse) with the maximum width in the elongated direction (the long axis) about 30 to 100 percent greater than the maximum width in the perpendicular direction (the short axis), the diametrically opposed voids or grooves being located at the long axis as in FIGURE 3.

The construction of this invention eliminates the need for vulcanization or bonding of the rubber to the inner or outer metal sleeve and provides a useful life much greater than can be obtained using a bonded construction.

It will be understood that, in accordance with the provisions of the patent statutes, variations and modifications of the specific devices shown herein may be made without departing from the spirit of the invention.

Having described my invention, I claim:

1. A yieldable bushing assembly comprising a rigid circumferentially continuous axially elongated tubular outer sleeve, a rigid tubular inner sleeve within and coaxial with said outer sleeve and having an axial length greater than that of said outer sleeve, and a tubular elastic rubber insert compressed between said inner and outer sleeves and extending axially beyond the opposite ends of said outer sleeve, said insert being under relatively high axial elongation and radial compression and having outer end portions with a normal cross-sectional area greater than that between said sleeves which outer end portions fill the space between said sleeves at opposite ends of said outer sleeve, said insert having an intermediate portion between inner and outer said end portions with a cross-sectional area less than that between said sleeves, said intermediate portion having diametrically opposed grooves between said outer end portions which extend axially about ½ to ⅔ the length of the rubber insert.

2. A yieldable bushing assembly comprising a rigid circumferentially continuous axially elongated tubular outer sleeve, a rigid tubular inner sleeve within and coaxial with said outer sleeve and having an axial length greater than that of said outer sleeve, and a tubular elastic rubber insert compressed between said inner and outer sleeves and extending axially beyond the opposite ends of said outer sleeve, said insert being under relatively high axial elongation and radial compression, said rubber insert before assembly having an axial length at least 10% less than its length when assembled between said inner and outer sleeves and having outer end portions with a normal cross-sectional area greater than that between said inner and outer sleeves which end portions fill the space between said sleeves at opposite ends of said outer sleeve, said insert having an intermediate portion extending between said end portions with a cross-sectional area less than that between said sleeves, said intermediate portion having two diametrically opposed axially elongated grooves, each with a radial depth greater than the radial thickness of the insert at the bottom of the groove, each groove extending circumferentially at least 60 degrees around the periphery of the unstressed rubber insert and extending axially about ½ to ⅔ the length of the insert.

3. A tubular axially elongated elastic rubber insert of substantially uniform axial length having an internal cylindrical surface, outer end portions of rounded lateral cross section with circumferentially continuous outer surfaces coaxial with said internal surface, and an intermediate portion connecting said end portions, said intermediate portions having two diametrically opposed grooves, each with a radial depth greater than the radial thickness of the insert at the bottom of the groove, each groove extending circumferentially about 60 to 100 degrees around the periphery of the rubber insert and extending axially about ½ to ⅔ the length of the insert, each groove having generally flat radially extending side walls, said intermediate portion having cylindrical outer surfaces between said grooves coaxial with said internal surface and of the same shape as the adjacent outer surfaces of said end portions, said outer surfaces of both intermediate portions extending circumferentially a total of more than 150 degrees around the periphery of the insert.

4. A yieldable bushing assembly comprising a rigid axially elongated tubular outer sleeve, a rigid tubular inner sleeve within and coaxial with said outer sleeve and having an axial length greater than that of said outer sleeve, and a tubular elastic rubber insert compressed between said inner and outer sleeves and extending axially beyond the opposite ends of said outer sleeve, said insert being under relatively high axial elongation and radial compression, said rubber insert in the normal unstressed condition having an axial length at least 10% less than its length when assembled between said inner and outer sleeves, said insert having outer end portions with a cross-sectional area greater than that between said sleeves which fill the space between said sleeves at opposite ends of said outer sleeve and having an intermediate portion between said end portions with a cross-sectional area less than that between said sleeves, said intermediate portion having two diametrically opposed grooves, each with a radial depth about ⅓ to 3 times the radial thickness of the insert at the bottom of the groove, each groove extending circumferentially about 60 to 100 degrees around the periphery of the rubber insert and extending axially about ½ to ⅔ the length of the insert, the two marginal portions of the insert between said grooves engaging said outer sleeve throughout a total of more than 150 degrees of the periphery of said outer sleeve.

5. A bushing assembly as defined in claim 2 wherein said inner sleeve has a pair of radial ribs in alignment with the grooves of said rubber insert which deform the rubber portions forming the bottoms of said grooves.

6. In a front wheel suspension for automobiles having a frame, an upper supporting member rigidly mounted on said frame and extending downwardly therefrom, said supporting member having a pair of parallel link portions with axially aligned openings therein, and a lower connecting member having an end portion between said link portions providing an opening therein substantially in axial alignment with the openings in said link portions, the improvement which comprises: a yieldable bushing means pivotally connecting said upper and lower members comprising an axially elongated tubular outer sleeve fitting in the opening of said lower connecting member and mounted to move in unison with said lower member, said outer sleeve extending axially the major portion of the distance between said link portions, a tubular inner sleeve within and coaxial with said outer sleeve and having an axial length greater than that of said outer sleeve, said inner sleeve extending between said link portions, means rigidly connecting said inner sleeve to said link portions in axial alignment with the openings in said link portions, and a tubular elastic rubber insert compressed between said inner and outer sleeves and extending axially between said link portions and beyond the opposite ends of said outer sleeve to hold said lower member out of contact with said upper member, said insert being under relatively high axial elongation and radial compression, said rubber insert in the normal unstressed condition having an axial length at least 10% less than its length when assembled between said inner and outer sleeves and having outer end portions with a cross-sectional area greater than that between said sleeves which fill the space between said sleeves at opposite ends of said outer sleeve and having an intermediate portion between said end portions with a cross-sectional area less than that between said sleeves, said intermediate portion having two diametrically opposite grooves, each with a radial depth about ⅓ to 3 times the radial thickness of the insert at the bottom of the groove, each groove extending circumferentially about 60 to 100 degrees around the periphery of the rubber insert and extending axially about ½ to ⅔ the length of the insert, the marginal portions of the insert between said grooves engaging said outer sleeve throughout more than 150 degrees of the periphery of said outer sleeve when the insert is mounted between said inner and outer sleeves.

7. The improvement defined in claim 6 wherein each groove has a substantially uniform axial length and a substantially uniform width, the side walls of each groove being disposed generally in a radial direction.

8. The improvement defined in claim 6 wherein said outer sleeve has an oblate rounded cross section and said rubber insert in the normal unstressed condition has an outer surface of generally the same shape except at said grooves.

9. The improvement defined in claim 6 wherein said inner sleeve has a generally cylindrical inner surface and a pair of diametrically opposed radially outwardly projecting ribs extending the full length of said inner sleeve.

References Cited in the file of this patent

UNITED STATES PATENTS

| | | |
|---|---|---|
| 501,411 | Farrell | July 11, 1893 |
| 2,621,923 | Krotz | Dec. 16, 1952 |
| 3,082,999 | Wolf et al. | Mar. 26, 1963 |

FOREIGN PATENTS

| | | |
|---|---|---|
| 191,116 | Switzerland | May 31, 1937 |
| 48,306 | Netherlands | Apr. 15, 1940 |
| 517,722 | Italy | Mar. 2, 1955 |
| 758,591 | Great Britain | Oct. 3, 1956 |
| 1,033,047 | Germany | June 26, 1958 |
| 1,229,796 | France | Sept. 9, 1960 |
| 612,508 | Canada | Jan. 17, 1961 |

UNITED STATES PATENT OFFICE
CERTIFICATE OF CORRECTION

Patent No. 3,147,964                      September 8, 1964

Jack J. Wolf

It is hereby certified that error appears in the above numbered patent requiring correction and that the said Letters Patent should read as corrected below.

Column 5, line 62, strike out "said", and insert the after "between", in line 61, same column 5.

Signed and sealed this 12th day of January 1965.

(SEAL)
Attest:

ERNEST W. SWIDER                      EDWARD J. BRENNER
Attesting Officer                      Commissioner of Patents